US008682892B1

(12) United States Patent
Panda et al.

(10) Patent No.: US 8,682,892 B1
(45) Date of Patent: Mar. 25, 2014

(54) RANKING SEARCH RESULTS

(71) Applicant: Google Inc., Mountian View, CA (US)

(72) Inventors: Navneet Panda, Mountain View, CA (US); Vladimir Ofitserov, Foster City, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 13/631,020

(22) Filed: Sep. 28, 2012

(51) Int. Cl.
*G06F 17/30* (2006.01)
(52) U.S. Cl.
CPC .... *G06F 17/30864* (2013.01); *G06F 17/30286* (2013.01); *G06F 17/30067* (2013.01)
USPC ........... 707/726; 707/758; 707/688; 707/690; 707/692; 707/700
(58) Field of Classification Search
CPC ................................................ G06F 17/30864
USPC .......................... 707/758, 688, 690, 692, 700
See application file for complete search history.

(56) References Cited

U.S. PATENT DOCUMENTS

| | | | |
|---|---|---|---|
| 7,519,595 B2 * | 4/2009 | Solaro et al. ........................ | 1/1 |
| 8,190,602 B1 * | 5/2012 | James ........................... | 707/726 |
| 8,290,956 B2 * | 10/2012 | Maim ........................... | 707/737 |
| 2005/0256887 A1 * | 11/2005 | Eiron et al. .................... | 707/100 |
| 2010/0057645 A1 * | 3/2010 | Lauritsen ........................ | 706/11 |
| 2010/0082590 A1 * | 4/2010 | Nye .............................. | 707/706 |
| 2011/0106821 A1 * | 5/2011 | Hassanzadeh et al. ........ | 707/749 |
| 2011/0106836 A1 * | 5/2011 | Hassanzadeh et al. ........ | 707/769 |
| 2011/0184936 A1 * | 7/2011 | Lymberopoulos et al. ... | 707/721 |
| 2011/0184956 A1 * | 7/2011 | Dantsker et al. .............. | 707/741 |
| 2013/0103443 A1 * | 4/2013 | Ptak et al. ..................... | 705/7.13 |
| 2013/0159233 A1 * | 6/2013 | Mason et al. .................. | 706/45 |
| 2013/0159826 A1 * | 6/2013 | Mason et al. ................. | 715/205 |

* cited by examiner

*Primary Examiner* — Pierre Vital
*Assistant Examiner* — Nargis Sultana
(74) *Attorney, Agent, or Firm* — Fish & Richardson P.C.

(57) ABSTRACT

Methods, systems, and apparatus, including computer programs encoded on computer storage media, for ranking search results. One of the methods includes determining, for each of a plurality of groups of resources, a respective count of independent incoming links to resources in the group; determining, for each of the plurality of groups of resources, a respective count of reference queries; determining, for each of the plurality of groups of resources, a respective group-specific modification factor, wherein the group-specific modification factor for each group is based on the count of independent links and the count of reference queries for the group; and associating, with each of the plurality of groups of resources, the respective group-specific modification factor for the group, wherein the respective group-specific modification for the group modifies initial scores generated for resources in the group in response to received search queries.

46 Claims, 5 Drawing Sheets

RANKING SEARCH RESULTS

BACKGROUND

This specification relates to ranking search results for search queries submitted to an Internet search engine.

Internet search engines aim to identify resources, e.g., web pages, images, text documents, multimedia content, that are relevant to a user's needs and to present information about the resources in a manner that is most useful to the user. Internet search engines generally return a set of search results, each of which identifies a resource, in response to a user submitted query.

SUMMARY

In general, one innovative aspect of the subject matter described in this specification can be embodied in methods that include the actions of determining, for each of a plurality of groups of resources, a respective count of independent incoming links to resources in the group; determining, for each of the plurality of groups of resources, a respective count of reference queries; determining, for each of the plurality of groups of resources, a respective group-specific modification factor, wherein the group-specific modification factor for each group is based on the count of independent links and the count of reference queries for the group; and associating, with each of the plurality of groups of resources, the respective group-specific modification factor for the group, wherein the respective group-specific modification for the group modifies initial scores generated for resources in the group in response to received search queries.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include receiving a first search query from a user device; receiving data identifying a plurality of search result resources and respective initial scores for each of the search result resources; identifying a respective group of resources to which each of the search result resources belongs; and adjusting the initial score for each of the search result resources based on the group-specific modification factor for the group of resources to which the search result resource belongs to generate a respective second score for each of the search result resources.

The method can further include: using the respective second score to generate a respective ranking score for each of the search result resources; and providing search results to the user device, each search result identifying a respective search result resource, for presentation in an order according to the respective ranking scores.

The method can further include: making further adjustments to the respective ranking scores before providing the search results to the user device.

Identifying the group of resources to which each of the search result resources belongs can include: identifying the group of resources based on an Internet address of each of the search result resources.

Adjusting the initial score for each of the search result resources based at least in part on the group-specific modification factor for the group of resources to which the search result resource belongs can include: generating a respective resource-specific modification factor for each of the search result resources based on the group-based modification factors.

Adjusting the initial score for each of the search result resources based at least in part on the group-specific modification factor for the group of resources to which the search result resource belongs can further include: multiplying the initial score for the search result resource by the resource-specific modification factor for the search result resource.

Generating a respective resource-specific modification factor for a first search result resource can include: determining that the search query is navigational to the first search result resource; and generating the resource-specific modification factor for the first search result resource so that the resource-specific modification factor does not modify the initial score for the first search result resource when applied to the initial score.

Generating a respective resource-specific modification factor for a first search result resource can include: determining that the search query is not navigational to the first search result resource. Generating a respective resource-specific modification factor for the first search result resource can further include: determining that the initial score for the search result resource does not exceed a first threshold value; and generating the resource-specific modification factor for the first search result resource so that the resource-specific modification factor does not modify the initial score for the first search result resource when applied to the initial score.

Generating a respective resource-specific modification factor for a second search result resource can include: determining that the initial score for the second search result resource exceeds the first threshold value but does not exceed a second, higher threshold value; and generating the resource-specific modification factor for the second search result resource, wherein the resource-specific modification factor ($f_1$) for the second search result resource is equal to: $f=T_1+(IS-T_1)\cdot M/IS$, wherein $T_1$ is the first threshold value, IS is the initial score for the second search result resource, and M is the group-based modification factor for the group of resources to which the second search result resource belongs.

Generating a respective resource-specific modification factor for a third search result resource can further include: determining that the initial score for the third search result resource exceeds the second threshold value; and generating the resource-specific modification factor for the third search result resource, wherein the resource-specific modification factor ($f_2$) for the third search result resource is equal to: $f_2=f_3/\log_{T_2}(IS)\cdot g(f_3)$, wherein $T_2$ is the second threshold value, $f_3$ is an initial resource-specific modification factor for the third search result resource and $g(f_3)$ is a smoothing function that reduces the effect of the resource-specific modification factor for the third search result resource on the initial score for the third search result resource for particular ranges of values of the initial resource-specific modification factor.

The initial resource-specific modification factor ($f_3$) for the third search result resource can be equal to: $f_3=T_1+(IS-T_1)\cdot M/IS$, wherein $T_1$ is the first threshold value, IS is the initial score for the third search result resource, and M is the group-based modification factor for the group of resources to which the third search result resource belongs.

The smoothing function can be defined as: $g(f_3)=1$, if $f_3 \leq Q$ and $g(f_3)=(1-f_3)/1-P$, if $f_3 > Q$, wherein Q is a predetermined threshold value.

An independent link for a particular group of resources can be a link from a source resource to a target resource, wherein the target resource is included in the particular group of resources, and wherein the source resource and the target resource have been determined to be independent.

Determining that the source resource and the target resource are independent can include: determining that the source resource and the target resource are included in different groups of resources. The source resource can be included in a source group of resource, and determining that the source resource and the target resource are independent can include: determining that the source group and the target group are not likely to be related.

Determining that the source resource and the target resource are independent can include: determining that the source resource is not likely to be a duplicate of the target resource.

A reference query for a particular group of resources can be a previously submitted search query that has been categorized as referring to a resource in the particular group of resources. Categorizing a particular previously submitted search query as referring to a resource in the particular group of resources can include: determining that the particular previously submitted search query includes one or more terms that have been determined to refer to the resource in the particular group of resources.

Determining a respective group-specific modification factor for a particular group of resources can include: determining an initial modification factor for the particular group of resources, wherein the initial modification factor is a ratio of a number of independent links counted for the particular group to the number of reference queries counted for the particular group.

Determining a respective group-specific modification factor for the particular group of resources can further include: partitioning the plurality of groups of resources into a plurality of partitions based on the respective counts of reference queries; and determining a normalized modification factor for the particular group by normalizing the initial modification factor for the particular group based on the respective initial modification factors for the groups of resources included in the same partition as the particular group.

The subject matter described in this specification can be implemented in particular embodiments so as to realize one or more of the following advantages. Search results identifying low-quality resources can be demoted in a presentation order of search results returned in response to a user's query. Thus, the user experience can be improved because search results higher in the presentation order will better match the user's informational needs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
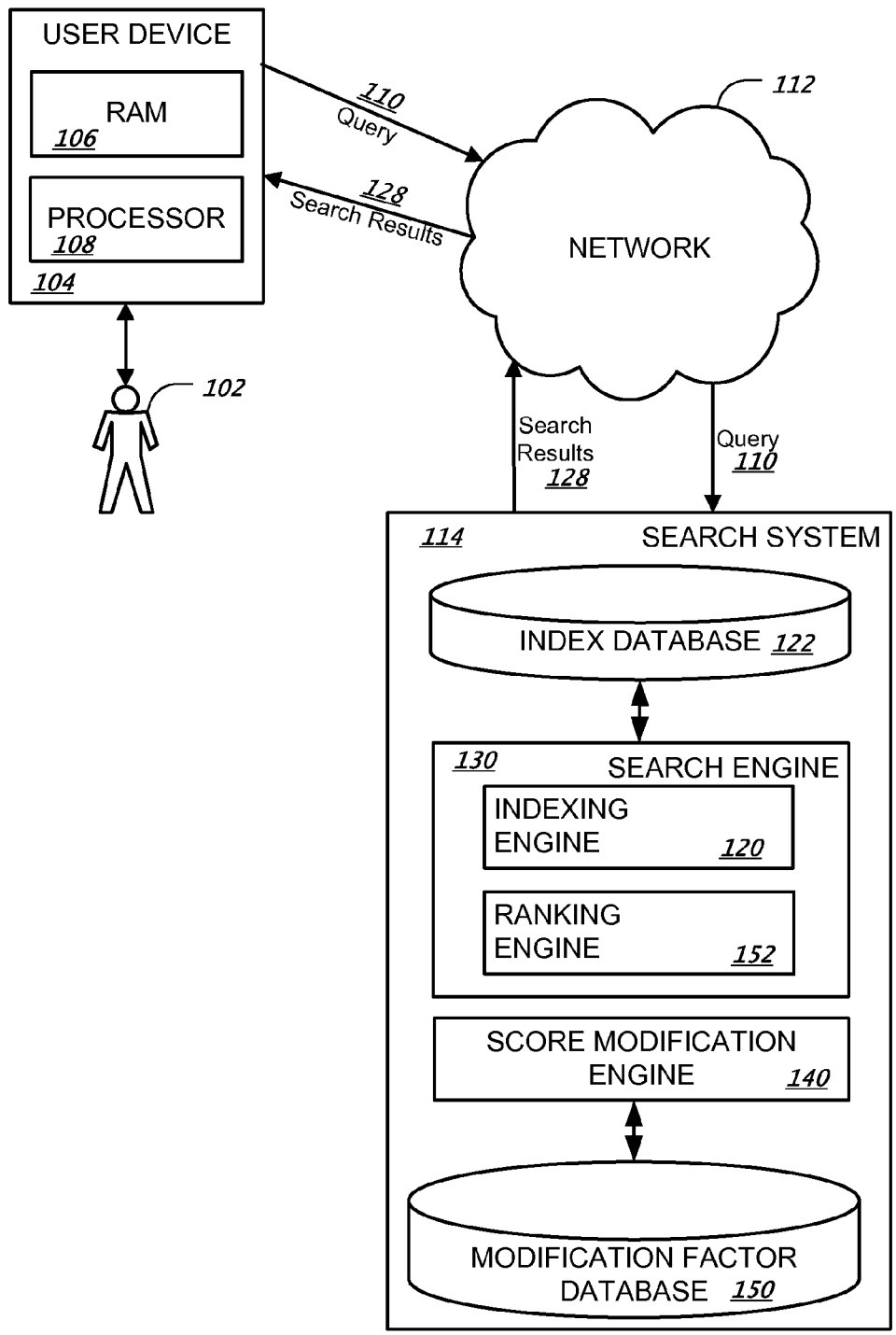
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. The user device 104 will generally include a memory, e.g., a random access memory (RAM) 106, for storing instructions and data and a processor 108 for executing stored instructions. The memory can include both read only and writable memory. For example, the user device 104 can be a computer coupled to the search system 114 through a data communication network 112, e.g., local area network (LAN) or wide area network (WAN), e.g., the Internet, or a combination of networks, any of which may include wireless links.

In some cases, the search system 114 can be implemented on the user device 104, for example, if a user installs an application that performs searches on the user device 104.

In some implementations, the search system 114 provides a user interface to the user device 104 through which the user 102 can interact with the search system 114. For example, the search system 114 can provide a user interface in the form of web pages that are rendered by a web browser running on the user device 104.

A user 102 can use the user device 104 to submit a query 110 to a search system 114. A search engine 130 within the search system 114 performs a search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

The search system 114 also includes or can communicate with a score modification engine 140 that generates modification factors that are applied by the search system 114 to initial scores generated by the search engine 130 for resources that match the query 110. The score modification engine 140 can generate the modification factors based at least in part on modification data that associates a respective modification factor with each of a number of multiple groups of resources. The modification data is stored in a repository accessible to the system, e.g., a modification factor database 150.

A group of resources is a portion of the resources on the Internet. A group can be defined in any of a variety of ways. An address-based group of resources is a group of resources that is defined by the Internet addresses, e.g., Uniform Resource Locators (URLs), of the resources in the group. Resources are grouped so that a resource cannot be included in more than one group of resources. For example, a group of resources can include each resource that can be accessed using a particular domain name. That is, the group could include http://www.domain.com/resource1, http://wwww.domain.com/resource2, http://www.domain.com/resourceN, and so on, without regard to when the resources first become available to the search engine 130 for indexing. Alternatively, a group of resources can include each resource that can be accessed using a particular host name, e.g., http://host.example.com/resource1, http://host.example.com/resource2, http://host.example.com/resourceN, and so on. Other address-based groupings are possible. For example, a particular group can include only a portion of the resources that can be accessed using a particular host name or a particular domain name. Alternatively, a particular group may include all the resources that can be accessed using a particular host name or a particular domain name and resources that can be accessed using another host name or domain name. Generating a modification factor for a group of resources, and in particular for an address-based group of resources, will be described below with reference to FIGS. 3 and 4.

Figure 2:
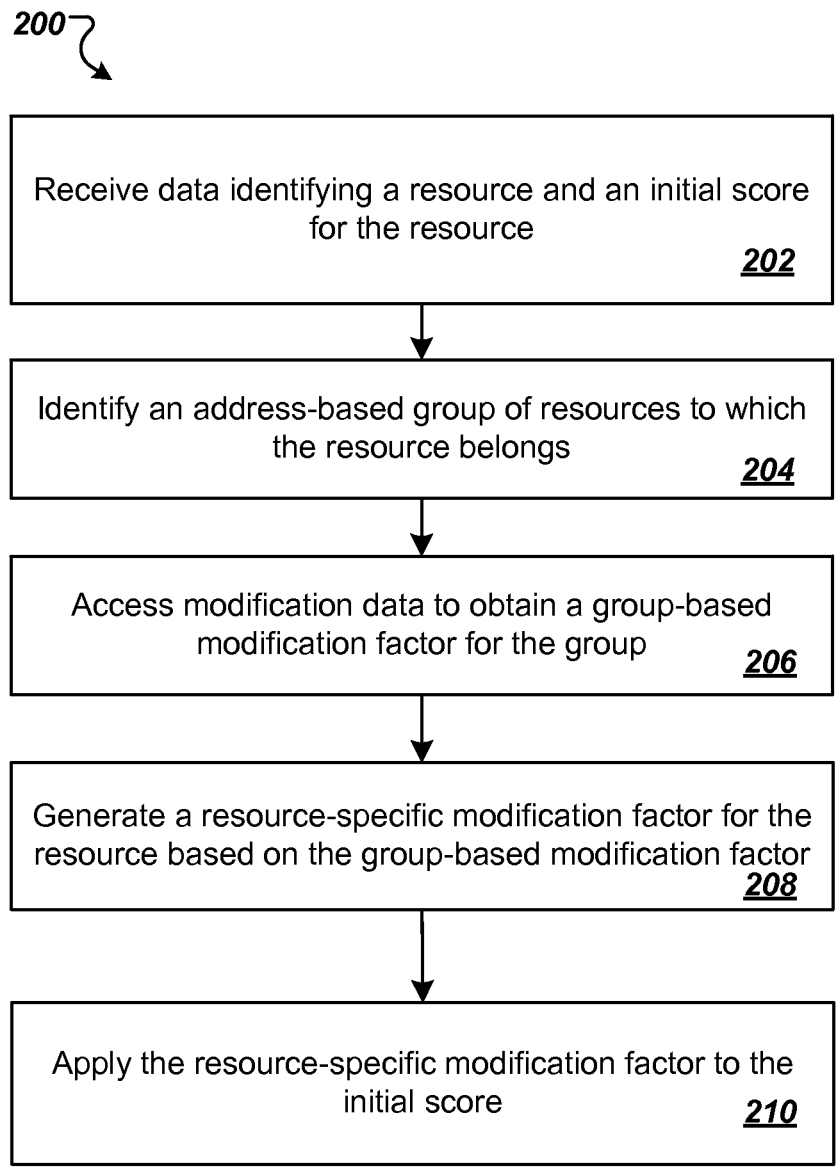
FIG. 2 is a flow diagram of an example process for adjusting an initial score for a resource identified by search results for a received search query.

FIG. 2 is a flow diagram of an example process 200 for adjusting an initial score for a resource identified by search results for a received search query. For convenience, the process 200 will be described as being performed by a system of one or more computers located in one or more locations. For example, a search system, e.g., the search system 114 of FIG. 1, can be used to perform the process 200.

The system receives data identifying a resource, e.g., a resource identifier of some kind, and an initial score for the resource (step 202). The initial score is generated for the resource as a response to a received search query. For example, the initial score can be, e.g., a measure of the relevance of the resource to the search query, a measure of the quality of the resource, or both.

The system identifies an address-based group of resources to which the resource belongs (step 204). The system can identify the group of resources to which the resource belongs based on the URL by which the resource is accessed. For example, the group can be the resources that share the same domain name or the resources that share the same host name.

The system accesses modification data to obtain a group-based modification factor for the group of resources to which the resource belongs (step 206). The modification data is stored in a repository of modification data, e.g., the modification factor database 150 of FIG. 1. The modification data can include data that associates a respective modification factor with each of a number of groups.

The system generates a resource-specific modification factor for the resource based on the group-based modification factor (step 208). Generally, the system can adjust the group-based modification factor based one or more query-specific parameters to generate the resource-specific modification factor for the resource. Generating a resource-specific modification factor based on a group-based modification factor will be described in more detail below with reference to FIG. 5.

The system applies the resource-specific modification factor to the initial score for the resource (step 210). For example, the resource-specific modification factor can be a multiplicative factor applied to the initial score to generate a modified score for the resource. The search results generated in response to the search query can then be ranked according to modified scores for the respective resources identified by the search results. Alternatively, the modified scores can be further adjusted before the search results are ranked and transmitted to a client device for presentation.

Figure 3:
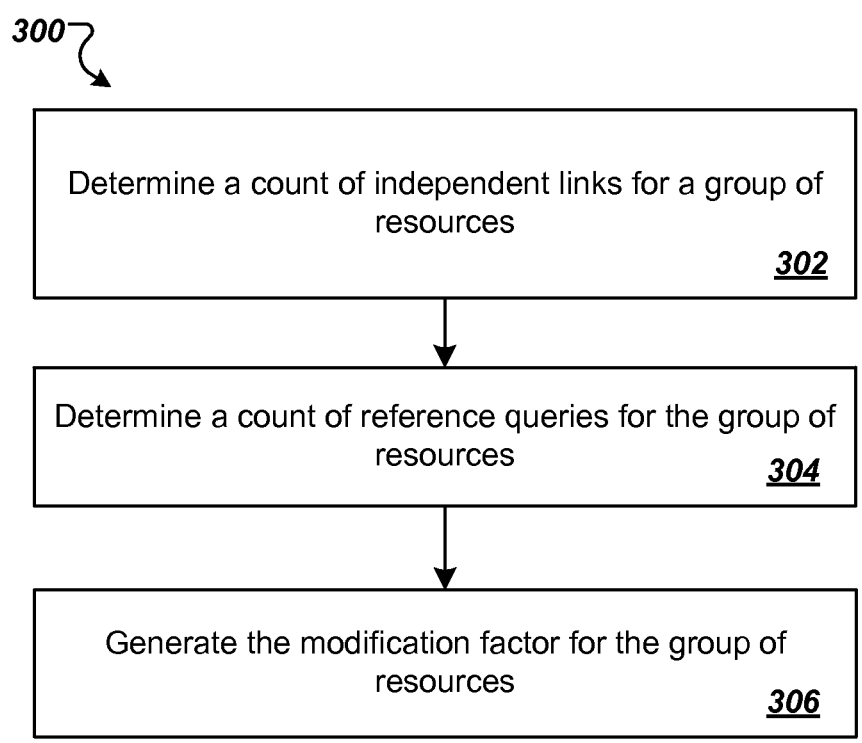
FIG. 3 is a flow diagram of an example process for determining a modification factor for a group of resources.

FIG. 3 is a flow diagram of an example process 300 for determining a modification factor for a group of resources. For convenience, the process 300 will be described as being performed by a system of one or more computers located in one or more locations. For example, a search system, e.g., the search system 114 of FIG. 1, can be used to perform the process 300.

The process 300 is performed for each group of a number of groups of resources.

The system determines a count of independent links for the group (step 302). A link for a group of resources is an incoming link to a resource in the group, i.e., a link having a resource in the group as its target. Links for the group can include express links, implied links, or both. An express link, e.g., a hyperlink, is a link that is included in a source resource that a user can follow to navigate to a target resource. An implied link is a reference to a target resource, e.g., a citation to the target resource, which is included in a source resource but is not an express link to the target resource. Thus, a resource in the group can be the target of an implied link without a user being able to navigate to the resource by following the implied link.

The determination of whether a link is, i.e., is counted as, an independent link is made based on the source resource and the target resource of the link. In particular, the system determines whether the source resource and the target resource are independent of each other. If the resources are independent, the system determines that the link is an independent link.

The system can consider any of a variety of factors in determining whether two resources are independent. For example, the system may determine whether the two resources are included in the same group of resources. If the two resources are included in the same group, the system can determine that the two resources are not independent.

As another example, the system may have access to data that indicates whether groups of resources are likely to be related. Related groups of resources are groups that include resources that are, e.g., owned by the same entity, hosted by the same entity, or that were created by the same entity. If the data indicates that the two resources are included in respective groups that are likely to be related, the system can determine that the two resources are not independent.

As another example, the system may have access to data that indicates how similar two resources are in one or more aspects, e.g., based on whether the two resources have identical or similar content, identical or similar images, identical or similar formatting, e.g., identical or similar Cascading Style Sheets (CSS), and so on. If the data indicates that the two resources are sufficiently similar, the system can determine that the two resources are not independent.

In some implementations, in order for two resources to be determined to be independent, each factor considered by the system must indicate that the two resources are independent. In other implementations, the system calculates an independence score from the values of the attributes considered by the system for a pair of resources, and classifies the two resources as being independent if the independence score satisfies an independence criterion.

If the target resource for a link is included in the group of resources and the source resource for the link has been determined to be independent from the target resource, the system counts the link as an independent link for the group. In some implementations, the system counts at most one link from resources in any one source group as an independent link for a target group. Alternatively, if more than one independent link is identified from resources in a source group to resources in the target group, the number of independent links counted for the target group by the system may be a function of the total number of independent links. For example, the counted number of independent links may be the total number of independent links from resources in the source group to resources in the target group, a logarithm of the total number of independent links from resources in the source group to resources in the target group, or other non-decreasing function of the actual number.

The system determines a count of reference queries for the group (step 304). A reference query for a group of resources is a search query that has been submitted to a search engine and has been classified as referring to a resource in the group. A query can be classified as referring to a particular resource if the query includes a term that is recognized by the system as referring to the particular resource. For example, a term that refers to a resource may be all of or a portion of a resource identifier, e.g., the URL, for the resource. For example, the term "example.com" may be a term that is recognized as referring to the home page of that domain, e.g., the resource whose URL is "http://www.example.com". Thus, search queries including the term "example.com" can be classified as referring to that home page. As another example, if the system has data indicating that the terms "example sf" and "esf" are commonly used by users to refer to the resource whose URL is "http://www.sf.example.com," queries that contain the terms "example sf" or "esf", e.g., the queries "example sf news" and "esf restaurant reviews," can be counted as reference queries for the group that includes the resource whose URL is "http://www.sf.example.com."

In addition or in the alternative, a query can be categorized as referring to a particular resource when the query has been determined to be a navigational query to the particular resource. From the user point of view, a navigational query is a query that is submitted in order to get to a single, particular web site or web page of a particular entity. The system can determine whether a query is navigational to a resource by accessing data that identifies queries that are classified as navigational to each of a number of resources.

In some implementations, the system counts only queries submitted by unique users as reference queries for the group. That is, a query that includes a term that has been categorized as referring to a resource in the group is counted as a reference query only if the user submitting the query has not previously submitted a query that has been categorized as referring to any resource in the group. The system can determine whether a user is unique, i.e., whether the user has previously submitted a query that has been categorized as referring to any resource in the group, using conventional techniques, e.g., based on an identifier of a cookie or a login identifier. That is, for example, only one reference query for each cookie identifier can be counted as a unique query for the group of resources. The count of reference queries can be determined over a specified time period or, alternatively, each reference query recorded in data available to the system can be included in the count of reference queries.

The system generates a modification factor for the group of resources from the count of independent links and the count of reference queries (step 306). For example, the modification factor can be a ratio of the number of independent links for the group to the number of reference queries for the group. That is, the modification factor (M) can be expressed as:

$$M=IL/RQ,$$

where IL is the number of independent links counted for the group of resources and RQ is the number of reference queries counted for the group of resources.

In some implementations, instead of storing the modification factor for a group of resources for use in adjusting initial scores for resources in the group, the system normalizes the modification factors and stores the normalized modification factors for use in adjusting the initial scores.

Figure 4:
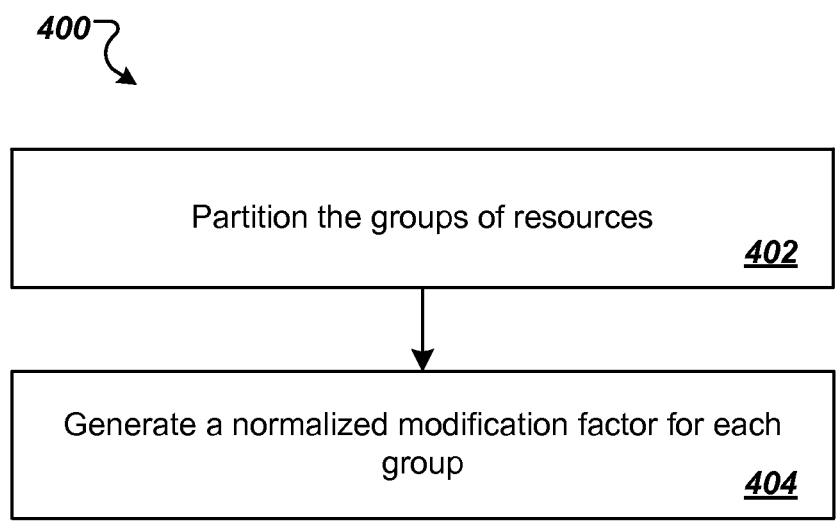
FIG. 4 is a flow diagram of an example process for determining normalized modification factors for groups of resources.

FIG. 4 is a flow diagram of an example process 400 for determining normalized modification factors for groups of resources. For convenience, the process 400 will be described as being performed by a system of one or more computers located in one or more locations. For example, a search system, e.g., the search system 114 of FIG. 1, can be used to perform the process 400.

The system partitions the groups of resources (step 402). The system can partition the groups of resources based on the count of reference queries for each of the groups, e.g., so that each partition includes groups of resources whose counts of reference queries are within a respective range of counts of reference queries. By doing so, the system can compare modification factors only between groups of resources that have similar counts of reference queries, e.g., because the modification factors may not scale well as the counts of reference queries increase.

The system generates a normalized modification factor for each group (404). For each group in a given partition, the system normalizes the modification factor for the group based on the modification factors for the other groups in the partition. For example, the system may compute a statistical measure (m) of the modification factors of the groups in the partition. For example, the statistical measure can be a measure of central tendency, e.g., the arithmetic, geometric, or harmonic mean of the modification factors, the median of the modification factors, the mode of the modification factors, and so on. Alternatively, the statistical measure may be a maximum or minimum of the modification factors. The normalized modification factor (NM) for a given group in the partition may then be expressed as:

$$NM=M-m/m$$

where M is the modification factor for the group and m is the statistical measure of the modifications factors of the groups in the partitions.

Figure 5:
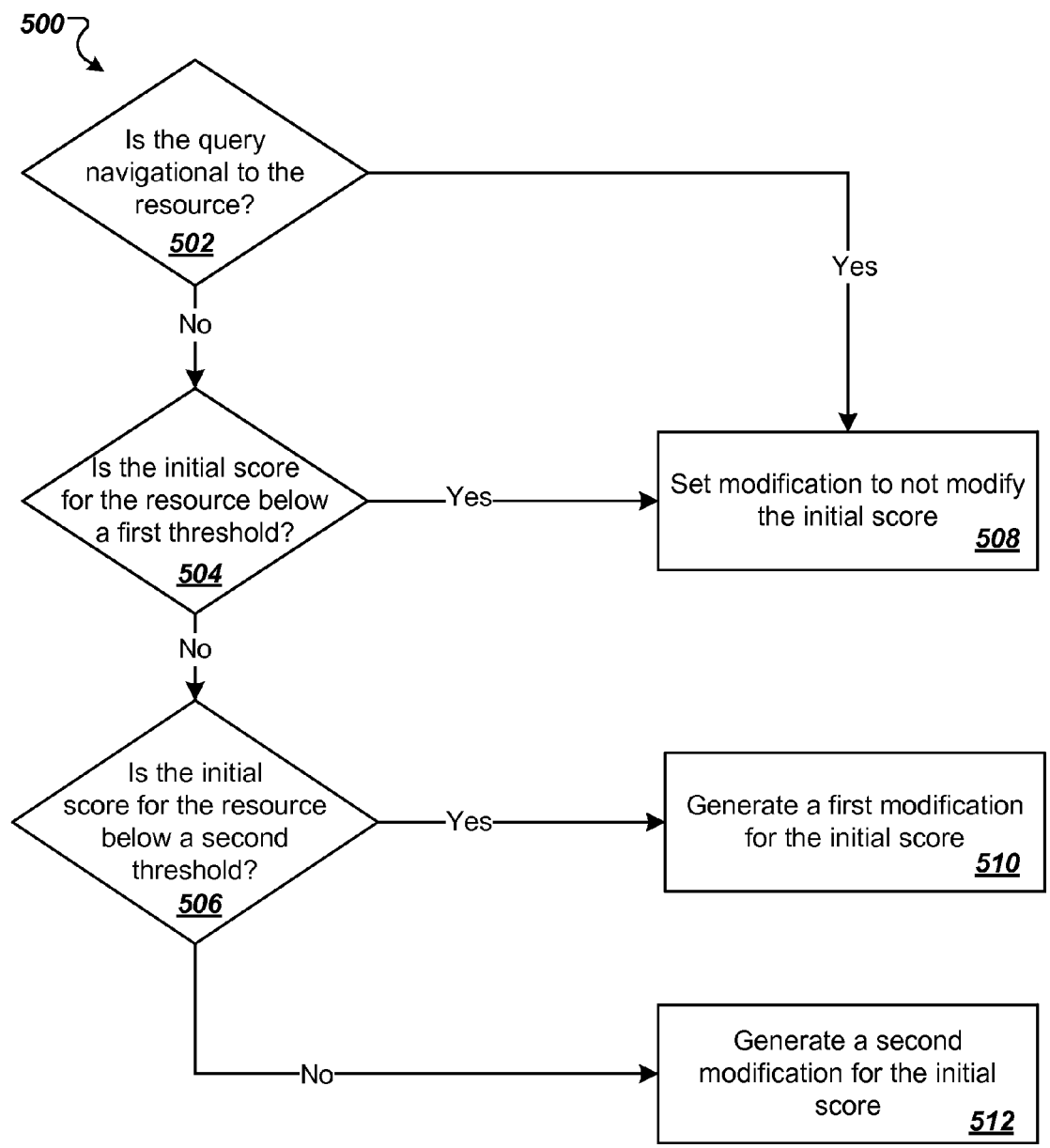
FIG. 5 is a flow diagram of an example process for generating a resource-specific modification factor for a resource.

FIG. 5 is a flow diagram of an example process for generating a resource-specific modification factor for a resource. For convenience, the process 500 will be described as being performed by a system of one or more computers located in one or more locations. For example, a search system, e.g., the search system 114 of FIG. 1, can be used to perform the process 500.

The process 500 can be performed for each of a number of resources in response to a search query received from a user.

The system determines whether the received query is navigational to the resource (step 502). For example, the system can determine whether the received query is navigational to the resource by accessing data that identifies queries that are classified as navigational to the resource.

If the received query is navigational to the resource, the system sets the modification factor to a value that does not alter the value of the initial score (step 508), e.g., if the modification factor is multiplicative, the system sets the value of the modification factor to one.

If the query is not navigational to the resource, the system determines whether the initial score for the resource is below a first threshold value (step 504). If the initial score for the resource is below the first threshold value, the system sets the modification factor to a value that does not alter the value of the initial score (step 508).

If the initial score for the resource is not below the first threshold value, the system determines whether the initial score is below a second, higher threshold value (step 506). If the initial score is below the second threshold, the system generates a first modification factor to be applied to the initial score (step 510). For example, if the modification factor is multiplicative, the first modification factor $f_1$ can be expressed as:

$$f_1 = T_1 + (IS - T_1) \cdot M/IS,$$

where $T_1$ is the first threshold value, IS is the initial score, and M is the group-based modification factor for the group of resources to which the resource belongs. Thus, if the initial score for the resource is between the first and second threshold values, the system applies a modification factor that decreases as the initial score increases.

If the initial score is not below the second threshold value, the system generates a second modification factor to be applied to the initial score (step 512). The second modification factor can be computed based on the first modification factor. For example, if the modification factor is multiplicative, the second modification factor $f_2$ can be expressed as:

$$f_2 = f_1 / \log_{T_2}(IS) \cdot g(f_1),$$

where $T_2$ is the second threshold value and $g(f_1)$ is a smoothing function that reduces the effect of the second modification factor on the initial score for particular ranges of values of the first modification factor. For example, the smoothing function can be defined so that, if the first modification factor exceeds a threshold value, the second modification factor, when applied to the initial score, has a muted effect or no effect on the value of the initial score. In some implementations, the smoothing function is defined as a piecewise function, so that:

$$g(f_1) = 1, \text{ if } f_1 \leq Q \text{ and}$$

$$g(f_1) = (1 - f_1)/1 - P, \text{ if } f_1 > Q,$$

where Q is a predetermined threshold value. In these implementations, if the value of $\log_{T_2}(IS) \cdot g(f_1)$ is less than one, e.g., if $f_1$ is equal to one and the product is therefore equal to zero, the system can set $f_2$ equal to $f_1$ to avoid the value of $f_2$ being greater than $f_1$ or the value of $f_2$ being undefined.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    determining, for each of a plurality of groups of resources, a respective count of independent incoming links to resources in the group;
    determining, for each of the plurality of groups of resources, a respective count of reference queries;
    determining, for each of the plurality of groups of resources, a respective group-specific modification factor, wherein the group-specific modification factor for each group is based on the count of independent links and the count of reference queries for the group; and
    associating, with each of the plurality of groups of resources, the respective group-specific modification factor for the group, wherein the respective group-specific modification for the group modifies initial scores generated for resources in the group in response to received search queries.

2. The method of claim 1, further comprising;
    receiving a first search query from a user device;
    receiving data identifying a plurality of search result resources and respective initial scores for each of the search result resources;
    identifying a respective group of resources to which each of the search result resources belongs; and
    adjusting the initial score for each of the search result resources based on the group-specific modification factor for the group of resources to which the search result resource belongs to generate a respective second score for each of the search result resources.

3. The method of claim 2, further comprising:
    using the respective second score to generate a respective ranking score for each of the search result resources; and
    providing search results to the user device, each search result identifying a respective search result resource, for presentation in an order according to the respective ranking scores.

4. The method of claim 3, further comprising:
    making further adjustments to the respective ranking scores before providing the search results to the user device.

5. The method of claim 2, wherein identifying the group of resources to which each of the search result resources belongs comprises:
   identifying the group of resources based on an Internet address of each of the search result resources.

6. The method of claim 2, wherein adjusting the initial score for each of the search result resources based at least in part on the group-specific modification factor for the group of resources to which the search result resource belongs comprises:
   generating a respective resource-specific modification factor for each of the search result resources based on the group-based modification factors.

7. The method of claim 6, wherein adjusting the initial score for each of the search result resources based at least in part on the group-specific modification factor for the group of resources to which the search result resource belongs further comprises:
   multiplying the initial score for the search result resource by the resource-specific modification factor for the search result resource.

8. The method of claim 6, wherein generating a respective resource-specific modification factor for a first search result resource comprises:
   determining that the search query is navigational to the first search result resource; and
   generating the resource-specific modification factor for the first search result resource so that the resource-specific modification factor does not modify the initial score for the first search result resource when applied to the initial score.

9. The method of claim 6, wherein generating a respective resource-specific modification factor for a first search result resource comprises:
   determining that the search query is not navigational to the first search result resource.

10. The method of claim 9, wherein generating a respective resource-specific modification factor for the first search result resource further comprises:
    determining that the initial score for the search result resource does not exceed a first threshold value; and
    generating the resource-specific modification factor for the first search result resource so that the resource-specific modification factor does not modify the initial score for the first search result resource when applied to the initial score.

11. The method of claim 10, wherein generating a respective resource-specific modification factor for a second search result resource comprises:
    determining that the initial score for the second search result resource exceeds the first threshold value but does not exceed a second, higher threshold value; and
    generating the resource-specific modification factor for the second search result resource, wherein the resource-specific modification factor ($f_1$) for the second search result resource is equal to:

$$f_1 = T_1 + (IS - T_1) \cdot M/IS,$$

wherein $T_1$ is the first threshold value, IS is the initial score for the second search result resource, and M is the group-based modification factor for the group of resources to which the second search result resource belongs.

12. The method of claim 11, wherein generating a respective resource-specific modification factor for a third search result resource comprises:
    determining that the initial score for the third search result resource exceeds the second threshold value; and
    generating the resource-specific modification factor for the third search result resource, wherein the resource-specific modification factor ($f_2$) for the third search result resource is equal to:

$$f_2 = f_3 / \log_{T_2}(IS) \cdot g(f_3),$$

wherein $T_2$ is the second threshold value, $f_3$ is an initial resource-specific modification factor for the third search result resource and $g(f_3)$ is a smoothing function that reduces the effect of the resource-specific modification factor for the third search result resource on the initial score for the third search result resource for particular ranges of values of the initial resource-specific modification factor.

13. The method of claim 12, wherein the initial resource-specific modification factor ($f_3$) for the third search result resource is equal to:

$$f_3 = T_1 + (IS - T_1) \cdot M/IS,$$

wherein $T_1$ is the first threshold value, IS is the initial score for the third search result resource, and M is the group-based modification factor for the group of resources to which the third search result resource belongs.

14. The method of claim 12, wherein the smoothing function is defined as:

$$g(f_3) = 1, \text{ if } f_3 \leq Q \text{ and}$$

$$g(f_3) = (1 - f_3)/1 - P, \text{ if } f_3 > Q,$$

wherein Q is a predetermined threshold value.

15. The method of claim 1, wherein an independent link for a particular group of resources is a link from a source resource to a target resource, wherein the target resource is included in the particular group of resources, and wherein the source resource and the target resource have been determined to be independent.

16. The method of claim 15, wherein determining that the source resource and the target resource are independent comprises:
    determining that the source resource and the target resource are included in different groups of resources.

17. The method of claim 15, wherein the source resource is included in a source group of resource, and wherein determining that the source resource and the target resource are independent comprises:
    determining that the source group and the target group are not likely to be related.

18. The method of claim 15, wherein determining that the source resource and the target resource are independent comprises:
    determining that the source resource is not likely to be a duplicate of the target resource.

19. The method of claim 1, wherein a reference query for a particular group of resources is a previously submitted search query that has been categorized as referring to a resource in the particular group of resources.

20. The method of claim 19, wherein categorizing a particular previously submitted search query as referring to a resource in the particular group of resources comprises:
    determining that the particular previously submitted search query includes one or more terms that have been determined to refer to the resource in the particular group of resources.

21. The method of claim 1, wherein determining a respective group-specific modification factor for a particular group of resources comprises:
    determining an initial modification factor for the particular group of resources, wherein the initial modification factor is a ratio of a number of independent links counted for the particular group to the number of reference queries counted for the particular group.

22. The method of claim 21, wherein determining a respective group-specific modification factor for the particular group of resources further comprises:
   partitioning the plurality of groups of resources into a plurality of partitions based on the respective counts of reference queries; and
   determining a normalized modification factor for the particular group by normalizing the initial modification factor for the particular group based on the respective initial modification factors for the groups of resources included in the same partition as the particular group.

23. A system comprising one or more computers and one or more storage devices storing instructions that, when executed by the one or more computers, cause the one or more computers to perform operations comprising:
   determining, for each of a plurality of groups of resources, a respective count of independent incoming links to resources in the group;
   determining, for each of the plurality of groups of resources, a respective count of reference queries;
   determining, for each of the plurality of groups of resources, a respective group-specific modification factor, wherein the group-specific modification factor for each group is based on the count of independent links and the count of reference queries for the group; and
   associating, with each of the plurality of groups of resources, the respective group-specific modification factor for the group, wherein the respective group-specific modification for the group modifies initial scores generated for resources in the group in response to received search queries.

24. The system of claim 23, the operations further comprising;
   receiving a first search query from a user device;
   receiving data identifying a plurality of search result resources and respective initial scores for each of the search result resources;
   identifying a respective group of resources to which each of the search result resources belongs; and
   adjusting the initial score for each of the search result resources based on the group-specific modification factor for the group of resources to which the search result resource belongs to generate a respective second score for each of the search result resources.

25. The system of claim 24, the operations further comprising:
   using the respective second score to generate a respective ranking score for each of the search result resources; and
   providing search results to the user device, each search result identifying a respective search result resource, for presentation in an order according to the respective ranking scores.

26. The system of claim 25, the operations further comprising:
   making further adjustments to the respective ranking scores before providing the search results to the user device.

27. The system of claim 23, wherein an independent link for a particular group of resources is a link from a source resource to a target resource, wherein the target resource is included in the particular group of resources, and wherein the source resource and the target resource have been determined to be independent.

28. The system of claim 27, wherein determining that the source resource and the target resource are independent comprises:
   determining that the source resource and the target resource are included in different groups of resources.

29. The system of claim 27, wherein the source resource is included in a source group of resource, and wherein determining that the source resource and the target resource are independent comprises:
   determining that the source group and the target group are not likely to be related.

30. The system of claim 27, wherein determining that the source resource and the target resource are independent comprises:
   determining that the source resource is not likely to be a duplicate of the target resource.

31. The system of claim 23, wherein a reference query for a particular group of resources is a previously submitted search query that has been categorized as referring to a resource in the particular group of resources.

32. The system of claim 31, wherein categorizing a particular previously submitted search query as referring to a resource in the particular group of resources comprises:
   determining that the particular previously submitted search query includes one or more terms that have been determined to refer to the resource in the particular group of resources.

33. The system of claim 23, wherein determining a respective group-specific modification factor for a particular group of resources comprises:
   determining an initial modification factor for the particular group of resources, wherein the initial modification factor is a ratio of a number of independent links counted for the particular group to the number of reference queries counted for the particular group.

34. The system of claim 33, wherein determining a respective group-specific modification factor for the particular group of resources further comprises:
   partitioning the plurality of groups of resources into a plurality of partitions based on the respective counts of reference queries; and
   determining a normalized modification factor for the particular group by normalizing the initial modification factor for the particular group based on the respective initial modification factors for the groups of resources included in the same partition as the particular group.

35. A computer storage medium encoded with instructions that, when executed by one or more computers, cause the one or more computers to perform operations comprising:
   determining, for each of a plurality of groups of resources, a respective count of independent incoming links to resources in the group;
   determining, for each of the plurality of groups of resources, a respective count of reference queries;
   determining, for each of the plurality of groups of resources, a respective group-specific modification factor, wherein the group-specific modification factor for each group is based on the count of independent links and the count of reference queries for the group; and
   associating, with each of the plurality of groups of resources, the respective group-specific modification factor for the group, wherein the respective group-specific modification for the group modifies initial scores generated for resources in the group in response to received search queries.

36. The computer storage medium of claim 35, the operations further comprising;

receiving a first search query from a user device;

receiving data identifying a plurality of search result resources and respective initial scores for each of the search result resources;

identifying a respective group of resources to which each of the search result resources belongs; and adjusting the initial score for each of the search result resources based on the group-specific modification factor for the group of resources to which the search result resource belongs to generate a respective second score for each of the search result resources.

37. The computer storage medium of claim 36, the operations further comprising:

using the respective second score to generate a respective ranking score for each of the search result resources; and providing search results to the user device, each search result identifying a respective search result resource, for presentation in an order according to the respective ranking scores.

38. The computer storage medium of claim 37, the operations further comprising:

making further adjustments to the respective ranking scores before providing the search results to the user device.

39. The computer storage medium of claim 35, wherein an independent link for a particular group of resources is a link from a source resource to a target resource, wherein the target resource is included in the particular group of resources, and wherein the source resource and the target resource have been determined to be independent.

40. The computer storage medium of claim 39, wherein determining that the source resource and the target resource are independent comprises:

determining that the source resource and the target resource are included in different groups of resources.

41. The computer storage medium of claim 39, wherein the source resource is included in a source group of resource, and wherein determining that the source resource and the target resource are independent comprises:

determining that the source group and the target group are not likely to be related.

42. The computer storage medium of claim 39, wherein determining that the source resource and the target resource are independent comprises:

determining that the source resource is not likely to be a duplicate of the target resource.

43. The computer storage medium of claim 35, wherein a reference query for a particular group of resources is a previously submitted search query that has been categorized as referring to a resource in the particular group of resources.

44. The computer storage medium of claim 43, wherein categorizing a particular previously submitted search query as referring to a resource in the particular group of resources comprises:

determining that the particular previously submitted search query includes one or more terms that have been determined to refer to the resource in the particular group of resources.

45. The computer storage medium of claim 35, wherein determining a respective group-specific modification factor for a particular group of resources comprises:

determining an initial modification factor for the particular group of resources, wherein the initial modification factor is a ratio of a number of independent links counted for the particular group to the number of reference queries counted for the particular group.

46. The computer storage medium of claim 45, wherein determining a respective group-specific modification factor for the particular group of resources further comprises:

partitioning the plurality of groups of resources into a plurality of partitions based on the respective counts of reference queries; and determining a normalized modification factor for the particular group by normalizing the initial modification factor for the particular group based on the respective initial modification factors for the groups of resources included in the same partition as the particular group.

\* \* \* \* \*

UNITED STATES PATENT AND TRADEMARK OFFICE
CERTIFICATE OF CORRECTION

PATENT NO. : 8,682,892 B1
APPLICATION NO. : 13/631020
DATED : March 25, 2014
INVENTOR(S) : Navneet Panda and Vladimir Ofitserov It is certified that error appears in the above-identified patent and that said Letters Patent is hereby corrected as shown below:

Title Page Item (71) Applicant: Please delete "Mountian View" and replace with --Mountain View--

Signed and Sealed this
First Day of July, 2014

Michelle K. Lee
*Deputy Director of the United States Patent and Trademark Office*